United States Patent Office 3,367,984
Patented Feb. 6, 1968

3,367,984
PROCESS FOR PREPARING FLUOROALKANES
Ferenc M. Pallos, El Cerrito, and Attila E. Pavlath, Berkeley, Calif., assignors to Stauffer Chemical Company, New York, N.Y., a corporation of Delaware
No Drawing. Filed Jan. 16, 1967, Ser. No. 609,319
5 Claims. (Cl. 260—653)

ABSTRACT OF THE DISCLOSURE

A process for preparing fluoroalkanes such as 1,1-difluoroethane and 1,1-difluoropropane by reacting $$[AsCl_4]^+[AsF_6]^-$$

or $[SbCl_4]^+[SbF_6]^-$ with trithianes having the formula

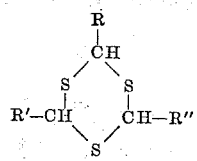

wherein R, R', and R'' are alkyl groups having from 1 to 5 carbon atoms by heating at atmospheric pressure at a temperature of at least 90° C. and collecting the fluoroalkanes.

---

Generally, the process of this invention comprises reacting a mixture of certain trithianes with the fluorochloroarsenic complex, $[AsCl_4]^+[AsF_6]^-$, or the fluorochloroantimony complex, $[SbCl_4]^+[SbF_6]^-$, and the recovering of the fluoroalkanes prepared by the reaction of these materials.

The exact mechanism for the reaction in the process of the present invention is not fully understood. However, it is obvious that one or more of the carbon-sulfur bonds of the cyclic trithianes is cleaved during the reaction followed by an addition of two fluorine atoms to the ring carbon atom of the certain trithiane and removal of the ring sulfur atoms of the trithiane. The fluorochloroarsenic complex and fluorochloroantimony complex act as active fluorinating agents in the process of this invention.

The preparation of the fluorochloroarsenic complex is described in the chemical literature by L. Kolditz on pages 313–320 of Zeit. Anng. Allg. Chem., 280, 1955. Generally, the preparation of the complex involves the chlorination of arsenic trifluoride with a stoichiometric amount of chlorine. In chlorinating the arsenic trifluoride, a small amount of water should be added to the arsenic trifluoride to serve as a catalyst in the reaction. If less than a stoichiometric amount of chlorine is used, then a solution of the complex in arsenic trifluoride can be prepared. The reaction can be run conveniently in conventional glass equipment. The physical properties of the fluorochloroarsenic complex are described in the article by L. Kolditz. The fluorochloroantimony complex can be prepared in a similar manner by chlorinating antimony trifluoride. The fluorochloroarsenic complex or the fluorochloroantimony complex can be prepared separately for addition to the trithianes, or they can be prepared in situ for reaction with the trithianes of this invention.

The trithianes that are useful in the practice of this invention are those having the formula

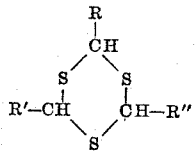

wherein R, R', and R'' are alkyl groups having from 1 to 5 carbon atoms. Preferably, R, R', and R'' are all methyl groups.

A review of the methods of preparing these trithianes is found in an article by E. Champaigne on pages 1 through 11 of Chem. Rev., vol. 39, 1946. One method described for the preparation of these trithianes involves the reaction of hydrogen sulfide with an aldehyde such as acetaldehyde or propionaldehyde with an acid catalyst to form 2,4,6-trimethyl-1,3,5-trithiane or 2,4,6-triethyl-1,3,5-trithiane, respectively. Other methods for the preparation of these trithianes are described elsewhere in the literature.

It is preferred to react the certain trithianes of this invention with the fluorochloroarsenic complex or the fluorochloroantimony complex for the preparation of fluoroalkanes by heating them at temperatures above 60° C. at atmospheric pressure. A preferred temperature range at atmospheric pressure is about 90° C. to about 160° C. Although the reaction can be run at higher temperatures, there is normally no advantage in doing so. Also, the reaction can be run at subatmospheric or superatmospheric pressures; however, there is no necessity to do so since the reaction can be conveniently run at atmospheric pressures.

Although process of this invention can be carried out by simply heating a mixture of certain trithiane of this invention and the fluorochloroarsenic or fluorochloroantimony complex without any mixing and collecting the reaction product, it is preferred to agitate the reactants during the reaction. Mechanical mixing has been found useful for the agitation. The mixing of the reactants can best be carried out by forming a slurry of them in an inert liquid such as arsenic trifluoride, for example.

The proportion of the fluorochloroarsenic complex or the fluorochloroantimony complex and the certain trithianes is not critical; however, it is preferred to react at least 6 moles of the complex to 1 mole of the trithiane. When the complex is prepared in situ, the preferred ratio of arsenic trifluoride or antimony trifluoride to chlorine to the certain trithiane is at least 12:12:1.

The fluoroalkanes produced by the process of this invention can be recovered by any conventional technique useful for collecting a gaseous product of a solid or liquid phase reaction mixture and then separating the products, if a mixture of products is obtained.

A convenient method for recovering the gaseous products of the process of this invention is to remove any high-boiling gaseous material from the product by condensing them, leaving low-boiling products. These can then be condensed by low temperature condensing techniques. Any high-boiling materials can be condensed with tap water in appropriate apparatus, and the low-boiling products such as 1,1-difluoroethane or 1,1-difluoropropane can be condensed with a Dry Ice-acetone mixture in appropriate apparatus. The low-boiling products can be cleaned of any acidic vapors by passing vapors of them through a basic solution such as dilute potassium hydroxide.

In the following examples, several preferred embodiments are described to illustrate the invention. However, it should be understood that the invention is not intended to be limited to the specific examples.

EXAMPLE I

The complex $[AsCl_4]^+[AsF_6]^-$ was prepared by placing 100 ml. of arsenic trifluoride and one iodine crystal into a three-neck 300 ml. reaction flask equipped with a stirrer and a piece of glass tubing that extended through a neck fitting to below the surface of the arsenic trifluoride. The flask was sealed. With stirring, chlorine was passed through the glass tubing and bubbled through the liquid arsenic trifluoride at room temperature. The chloride addition was continued until a thick slurry of $[AsCl_4]^+[AsF_6]^-$ in the unreacted portion of liquid arsenic trifluoride was obtained. The iodine crystal catalyzed the reaction between the $AsF_3$ and $Cl_2$.

A water-packeted distillation condenser was connected to one neck of the reaction flask. To the condenser was connected in series an air-cooled trap and another trap cooled with a Dry Ice and acetone mixture. The slurry of $[AsCl_4]^+[AsF_6]^-$ was cooled to about 0° C. to −5° C. Thirty grams of 2,4,6-trimethyl-1,3,5-trithiane was added to the slurry with stirring. Next, the reaction flask was heated slowly with an oil bath up to about 160° C., bath temperature. The gaseous reaction products were distilled during the heating. The high-boiling materials were collected in the air-cooled trap, and the low-boiling materials were collected in the trap cooled with the Dry Ice and acetone mixture.

After completion of the reaction as indicated by the cessation of distillation, the trap in the Dry Ice and acetone mixture was removed. The material in the trap was vaporized by heating, passed through a dilute solution of KOH, and recondensed in a flask cooled with a Dry Ice and acetone mixture. The clear, recondensed product was found by NMR analysis to be 1,1-difluoroethane.

EXAMPLE II

The process of Example I was repeated except that the complex $[AsCl_4]^+[AsF_6]^-$ was replaced with the complex $[SbCl_4]^+[SbF_6]^-$. The recondensed product of the reaction was found by analysis to be 1,1-difluoroethane.

Various modifications of the process of the present invention may be made without departing from the spirit or scope thereof, and it is to be understood that the invention is limited only as defined in the appended claims.

We claim:

1. A process for preparing fluoroalkanes which comprised reacting a complex selected from the group consisting of the fluorochloroarsenic complex, $[AsCl_4]^+[AsF_6]^-$, and the fluorochloroantimony complex, $[SbCl_4]^+[SbF_6]^-$, with a trithiane having the formula

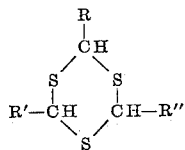

wherein R, R', and R'' are alkyl groups having from 1 to 5 carbon atoms and recovering said fluoroalkane.

2. The process of claim 1 wherein said complex is the fluorochloroarsenic complex, $[AsCl_4]^+[AsF_6]^-$, and said trithiane is 2,4,6-trimethyl-1,3,5-trithiane represented by the formula

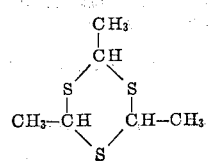

3. The process of claim 1 wherein said complex is the fluorochloroantimony complex, $[SbCl_4]^+[SbF_6]^-$, and said trithiane is 2,4,6-trimethyl-1,3,5-trithiane represented by the formula

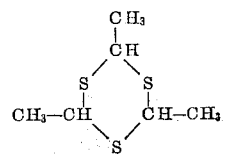

4. The process of claim 1 wherein said reacting is done by heating at atmospheric pressure at a temperature of at least 90° C. and wherein the mole ratio of said complex to said trithiane is at least 6:1.

5. The process of claim 2 wherein said reacting is done by heating at atmospheric pressure at a temperature of at least 90° C. and wherein the mole ratio of said complex to said trithiane is at least 6:1.

References Cited

UNITED STATES PATENTS 3,321,537    5/1967    Walker et al. _____ 260—653

DANIEL D. HORWITZ, Primary Examiner.